Dec. 25, 1962
B. HASKELL
3,070,198
HONEYCOMB STRUCTURES
Filed Sept. 29, 1959
2 Sheets-Sheet 1
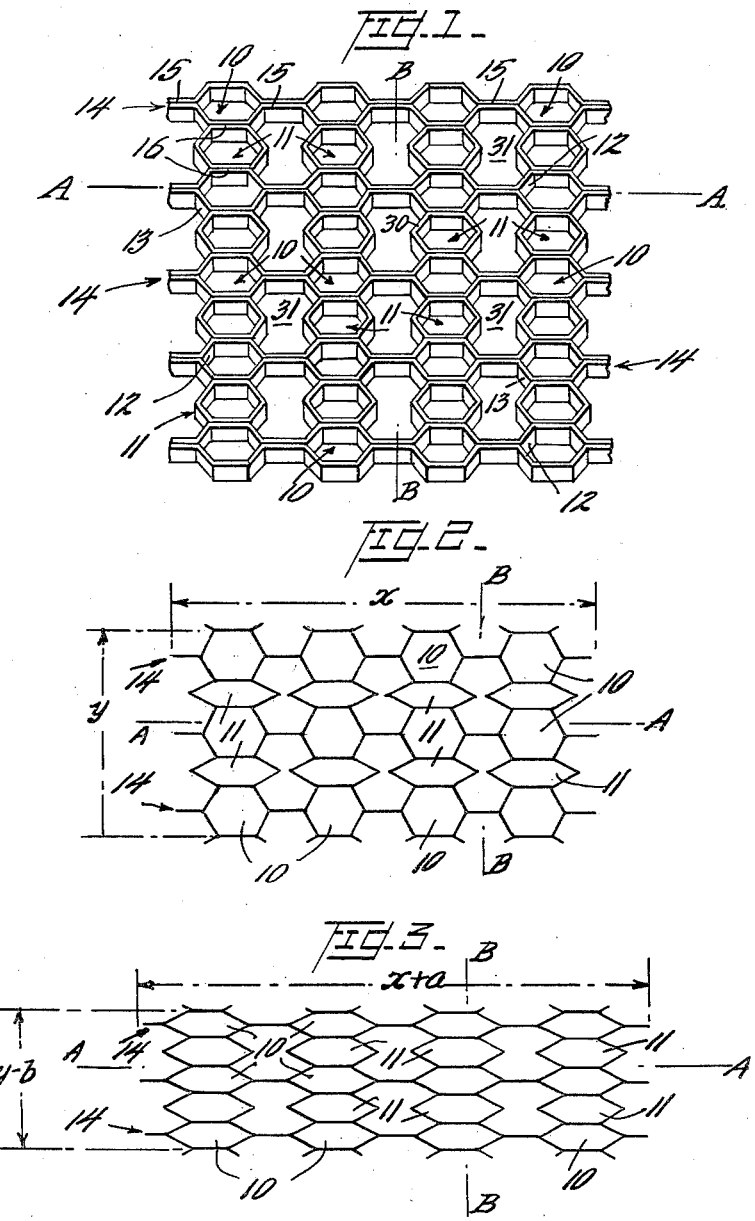
INVENTOR
*Boris Haskell*
BY *Pair Haskell + Levine*
ATTORNEYS

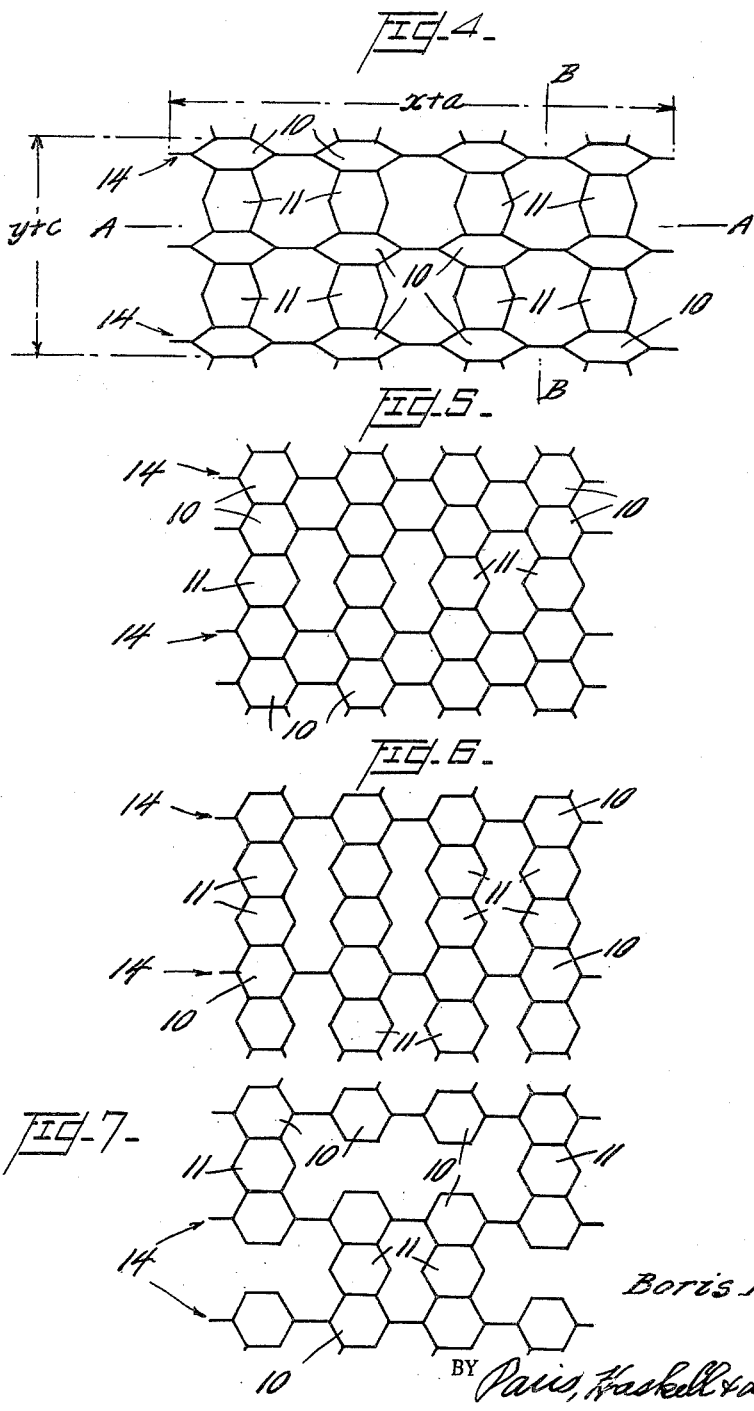

United States Patent Office 3,070,198
Patented Dec. 25, 1962

3,070,198
HONEYCOMB STRUCTURES
Boris Haskell, 3715 Underwood St., Chevy Chase, Md.
Filed Sept. 29, 1959, Ser. No. 843,289
12 Claims. (Cl. 189—82)

The present invention relates to structural honeycomb. The term structural honeycomb is generally used to describe a cellular structure formed from a relatively thin walled material, wherein said material forms the walls of the cells, and these walls are oriented generally in numerous planes all perpendicular to the honeycomb-plane, i.e. the plane in which the cells are arrayed. In its most conventional form, structural honeycomb is formed by laminating a plurality of superposed strips or sheets of a relatively flexible material with spaced areas of adhesive, the areas of adhesive in each lamination being staggered with respect to those on the next adjacent laminations. This laminated assembly is then expanded in a direction perpendicular to the planes of the strips or sheets to open the unsecured areas between the laminae and thus form the cellular structure referred to as structural honeycomb. Normally and preferably the cells of this structure are hexagonal in shape, although this is not an essential feature or characteristic.

Structural honeycomb is used in one application as a filler between two skins or plates, which sandwich the expanded honeycomb with the honeycomb walls perpendicular to the skins, and the edges of the honeycomb cells secured to the inside skin surfaces. Because the honeycomb walls are all oriented perpendicularly to the skins and are supported by their own interrelated array of cell walls, these sandwich structures are exceptionally strong, even though the cell walls may be formed from very thin gauge materials, and they present very great structural strength to weight ratios because of the large proportion of voids in the cellular structures. Honeycomb structures are also used alone, without confining skin coverings, for ornamental, or combined ornamental and structural purposes. Because of its expandable and contractable features, this honeycomb is also used in novelties, such as greeting cards and the like.

Conventionally, this honeycomb consists of an array of hexagonal cells with each cell (except peripheral cells) having each of its walls common with a wall of another cell, to form a completely interrelated and interconnected mass or array of cells. This type structure, whether formed with hexagonal or other shaped cells, suffers from the limitation that it cannot be expanded or extended along one axis in the honeycomb-plane without being contracted on an axis transverse thereto in the honeycomb-plane. Ancillary to, or because of this property of conventional honeycomb, any attempt to curve or flex the plane of the honeycomb cell array about any one axis, results in saddling of the honeycomb about that honeycomb-plane axis perpendicular to the first axis of curvature. Consequently, it is impossible to shape a sheet of expanded conventional honeycomb into a dome, for example, or into numerous other simple and compound surface contours without resorting to permanent or damaging deformations of the honeycomb structure. Accordingly, it has been a usual practice heretofore to apply honeycomb to a curved surface contour by piecing and patching in successive small areas, which obviously is laborious, time consuming, and expensive, and results in a comparatively weakened and non-uniform structure.

In accordance with the present invention, however, there is provided a honeycomb of uniform structural configuration over its expanse, which may be collapsed and expanded in the same manner as conventional honeycomb, retains substantially the same strength properties as conventional honeycomb, and is expandable on two perpendicular axes in the honeycomb-plane simultaneously. Consequently, an integral honeycomb array fabricated in accordance with the present invention will not be compelled to saddle when curved about an axis lying in the honeycomb-plane, and may be readily applied over any curved surface contour, including a dome shaped contour. As an example of its adaptability to surface curvature, the present honeycomb can be curved about one honeycomb-plane axis to bring one edge into contact with the opposite parallel edge to form a tube with the honeycomb cell walls extending radially relative to the tube axis. This tube can then be bent on its tubular axis without damaging the honeycomb structure. It is therefore contemplated that honeycomb fabricated in accordance with the teachings of the present invention is adapted for use as fillings for curved surface contour sandwich panels, as in the fabrication of domes and dome shapes, for example. Also the present honeycomb is well suited as an insulation and structural skin for flexible pipe or hose, and similarly as a dielectric support between the inner and outer conductors of coxial cable, and the like. For novelties and in other ornamental uses, the honeycomb of the present invention enables the use of contours, curves and bends heretofore impossible with conventional honeycomb structures.

It is therefore one object of the present invention to provide a structural honeycomb of integrated cells which can be expanded on one axis in the honeycomb-plane without being contracted on the other or perpendicular honeycomb-plane axis.

Another object of the present invention is to provide a structural honeycomb of integrated cells which can be expanded on two perpendicular honeycomb-plane axes simultaneously.

Another object of the present invention is to provide a structural honeycomb of integrated cells which can be flexed about one honeycomb-plane axis without saddling about the perpendicular honeycomb-plane axis.

Still another object of the present invention is to provide a structural honeycomb of integrated cells which can be flexed in either direction about two honeycomb-plane axes simultaneously.

Other objects and advantages of the present invention will become apparent to those skilled in the art from a consideration of the following detailed description of one specific embodiment of the invention had in conjunction with the accompanying drawings, in which like numerals refer to like or corresponding parts, and wherein:

FIG. 1 is a perspective view of a structural honeycomb formed in accordance with the present invention;

FIG. 2 is a schematic showing of the honeycomb of FIG. 1, in an illustrative semi-expanded reference state;

FIG. 3 is a schematic showing of the honeycomb expanded on one honeycomb-plane axis from the reference state of FIG. 2;

FIG. 4 is a schematic showing of the honeycomb expanded on a second honeycomb-plane axis perpendicular to said one axis from the state of FIG. 3; and FIGS. 5, 6, and 7 are schematic showings of modifications of the invention.

Referring to FIG. 1, like conventional structural honeycomb, the honeycomb of the present invention is formed from a plurality of thin gauge strips, forming the walls of the cells, with the cell walls oriented perpendicular to the plane of the honeycomb structure. The present structure is formed with two types of cells, primary cells 10, which are substantially similar to conventional honeycomb cells, and secondary cells 11. Secondary cells 11 differ quite substantially from conventional honeycomb cells with regard to their relationship or association with the other cells of the structure, in that there is no web interconnecting adjacent cells 11, such as web 15 interconnecting adjacent conventional cells 10.

Each strip 14 of primary cells 10 comprises two ribbons 12 and 13 of sheet stock, superposed and adhesively secured together at spaced intervals 15. The secondary cells 11 may be conveniently formed from thin walled tube stock. Secondary cells 11 are interposed between adjacent strips 14 of primary cells, and adhesively secured at 16 to the opposite cells 10 of each of the two strips 14. The areas of securement 16 are located on opposite portions of the secondary cells 11, and on portions of the strips 14 intermediate the areas 15 where the strips 12 and 13 are secured together to form the primary cells 10. By securing a plurality of strips 14 of primary cells and a plurality of secondary cells together in this manner, one obtains the honeycomb cell array indicated in FIG. 1, comprising a plurality of spaced parallel strips 14, interconnected by rows of the secondary cells 11 into an integral honeycomb array or mass. Instead of forming the secondary cells 11, as such, in the manufacture of the honeycomb, a similar effect can be obtained by starting with a conventional honeycomb array of completely interconnected cells, and severing the webs 15 that interconnect those adjacent cells which it is desired to convert into secondary cells 11.

This array may be completely collapsed on the B—B axis to collapse all the cells 10 and 11, and it may be expanded on the B—B axis to open the cells 10 and 11 to any desired degree, similar to conventional hexagonal honeycomb. Further, the honeycomb structure illustrated in FIG. 1 is capable of a degree of expansion on the axis A—A, or on the axis B—B, without contraction on the other axis. Similarly, this honeycomb can be expanded within limits simultaneously on both the axes A—A and B—B. Corollary to this independent expansion on two axes, or because of this feature, it is apparent that the present honeycomb structure can be flexed about one honeycomb-plane axis without saddling about the other honeycomb-plane axis, or it can be flexed in either directions about both said axes simultaneously, or can be easily flexed into various surface contours, both simple and complex. The feature of independent expansibility on both axes is illustrated in FIGS. 2–4. For purposes of illustration, one may start with the honeycomb in the semi-expanded condition of FIG. 2, with primary cells 10 expanded and secondary cells 11 not expanded or collapsed. The honeycomb section as illustrated in FIG. 2 is assigned a value $x$ for its A—A axis dimension, and a value $Y$ for its B—B axis dimension. The strips 14 can be expanded longitudinally, i.e. along the A—A axis, to convert the honeycomb section into the configuration of FIG. 3, resulting in increasing the A—A axis dimension to a value of $x+a$. Since the A—A axis expansion was effected through collapse of cells 10 in conventional honeycomb fashion, the dimension of the honeycomb section on the B—B axis has been decreased to a value of $Y-b$. However, while retaining the A—A axis dimension of $x+a$, the honeycomb section can be expanded on the B—B axis by fully expanding the secondary cells 11, to place the honeycomb section in the condition shown in FIG. 4. By this step, the B—B axis dimension has been increased to a value of $Y+c$, and the honeycomb section has now been expanded on both from its starting state of FIG. 2. Although this expansion has been illustrated and described in steps of expanding one honeycomb-plane axis then expanding the other, this is merely for purpose of illustration and explanation, and it is readily apparent that the honeycomb section of FIG. 2 can be expanded on both axes simultaneously and directly into the forms of FIG. 4.

From the foregoing it will be appreciated that the independence of the two axes in the present honeycomb stems from the secondary cells 11 being unconnected along one honeycomb-plane axis, axis A—A in the specific embodiment. Thus, cells 11 can expand or contract on the B—B axis without in any way affecting the A—A axis. Cells 10, however, being parts of conventional honeycomb strips 14, cannot change dimension on one axis without effecting an opposite change on the other perpendicular axis. This effect of the opposite change on the other axis can, however, be absorbed by cells 11 to prevent any overall change in this latter honeycomb-plane axis.

In the illustrated specific embodiment of the present invention, the rows of primary cells 10 and secondary cells 11 alternate, one for one. This is not necessary, however, and the secondary cells may alternate with groups of rows of primary cells, as shown in FIG. 5. Similarly, the secondary cells need not be rows of cells only a single cell deep, but may include successive rows of secondary cells, as indicated in FIG. 6. Similarly, it is not essential that in each row of secondary cells there be a secondary cell connecting each opposite pair of primary cells. As shown in FIG. 7, desired pairs of primary cells may be left unconnected.

Basically, therefore, the feature of simultaneous expansibility on two percendicular honeycomb-plane axes, and its concomitant feature of simultaneous flexibility about two perpendicular honeycomb-plane axes, are obtained in the forgoing embodiments from the secondary cells 11 interconnecting sections of primary cell honeycomb on only one honeycomb-plane axis, and the secondary cells being unconnected on the other or perpendicular honeycomb-plane axis. In other words, the honeycomb structure improvement as illustrated in the instant embodiment is the provision in the honeycomb of some rows of cells in which the cells are unconnected to each other along one honeycomb-plane axis, enabling the honeycomb structure to be expanded on one axis, through these unconnected cells, without the necessity of the structure contracting on a perpendicular axis.

Although the use of secondary cells 11 as herein specifically described is presently considered the preferred embodiment of the invention, it will be appreciated from the foregoing description that in its broader aspects the secondary cells 11 are effectively providing pleated or folded walls for selected cells. When viewed in this context, it will be appreciated from the foregoing description that appropriate pleats or folds in a cell enable the cell to expand on one axis without requiring a corresponding contraction on the opposite axis, because the overall circumference of the cell is able to expand as the pleats or folds unpleat or unfold. Expressed in other words, a honeycomb structure comprises an array of cells defined by side walls, and for present purposes a side wall is defined as a wall common to only two contiguous cells, thereby resulting in each cell having a separate side wall common with each contiguous pair of cells. By appropriately providing selected side walls with folds or pleats, the effect of expansibility of a honeycomb array simultaneously on two transverse axes can be obtained.

Translating the foregoing general discussion into the specific embodiment of the invention shown in FIG. 1, it will be seen that webs 30 meet the above definition of a side wall, being common only to cells 11 and 31, and these side walls 30 are pleated or folded. Thus, opposite side walls 30 of any given cell 31 or 11 are pleated or folded, and lines of such pleated wall cells are provided. These lines of such cells enable the entire honeycomb array to expand regularly on the B—B axis simply by expanding the overall length expanse or reach of walls 30, without requiring the array to contract on the A—A axis.

It is preferred to employ the double pleated webs 30 thus forming cells 11, to obtain maximum strength from the honeycomb structure. However, as will be apparent to those skilled in the art, a single pleated web 30 may be employed if desired in place of the double webs, thus eliminating cells 11, and leaving only cells 31 and 10, each remaining pleated web 30 then being common to the contiguous portions of adjacent cells 31.

Having disclosed the present invention by reference to the foregoing specific embodiments, it is understood that the invention is not limited to the details thereof; and such modifications and variations of these embodiments as are embraced by the spirit and scope of the appended claims are contemplated as within the purview of the present invention.

Since it is a salient feature of the present invention to provide a honeycomb structure which may be readily shaped into conformance with various surface contours, as distinguished from conventional honeycomb which cannot be readily changed in surface contour, it is understood that the term "honeycomb-plane" as used in the appended claims is not intended to be interpreted as restricted to a flat surface. This term "honeycomb-plane" is used herein and in the claims to include not only flat surfaces, but also curved surface contours, simple or complex, into which the array of cells may be shaped by simple or complex curvatures of the honeycomb array about A—A axes, B—B axes, and both axes simultaneously.

What is claimed is:

1. A honeycomb structure comprising a plurality of cells defined by walls occupying planes substantially perpendicular to the honeycomb-plane, each cell being completely circumscribed by said walls, said cells being arrayed along lines extending along one honeycomb-plane axis, the array of cells comprising at least two substantially parallel lines of primary cells, successive cells in each of said lines of cells being connected to each other to form a chain of cells, said two lines being spaced from each other in the honeycomb-plane, said two lines of cells being interconnected only by secondary cells, said secondary cells being unconnected to each other along said honeycomb-plane axis, whereby said two lines of cells can be separated from each other to increase the dimension of the structure along a line in the honeycomb-plane transverse to said axis through said secondary cells without altering the dimension of the structure along said axis, and said two lines of cells can be extended to increase the dimension of the structure along said axis without altering the dimension of structure transverse to said axis.

2. A honeycomb structure as set forth in claim 1, wherein said secondary cells constitute a single line of cells.

3. A honeycomb structure as set forth in claim 1, wherein said secondary cells constitute a plurality of adjacent interconnected lines of cells.

4. A honeycomb structure as set forth in claim 1, and including additional lines of primary cells connected to the first stated lines of primary cells.

5. A honeycomb structure as set forth in claim 1, wherein said secondary cells constitute a plurality of adjacent interconnected lines of cells, and including additional lines of primary cells connected to the first stated lines of primary cells.

6. A honeycomb structure comprising a plurality of cells defined by walls occupying planes substantially perpendicular to the honeycomb-plane, each cell being completely circumscribed by said walls, said cells being arrayed in substantially parallel lines of cells relative to one dimension of said structure, all the cells being interconnected to form an integrated array, the array of cells including a plurality of primary cells, said primary cells being connected to adjacent cells along said lines to form chains of primary cells, and said array further including a plurality of secondary cells, said secondary cells being unconnected to adjacent cells along said lines, said secondary cells being thereby free to expand along an axis transverse to said lines without contracting the structure along said lines.

7. A honeycomb structure as set forth in claim 6, wherein selected lines of cells are composed entirely of secondary cells.

8. A honeycomb structure comprising a number of cells defined by walls lying generally in planes transverse to the honeycomb-plane, each of said cells being completely circumscribed by said walls, and each wall except those peripheral to the structure being common to two contiguous cells, each non-peripheral wall being coextensive with and terminating with the termini of contiguity between its respective two cells, at least two walls of each of only a first plurality of said cells including an extensible and contractable structural configuration for permitting substantial increasing and decreasing relative adjustment of the extent of straight line separation of said termini defining the terminations of the last mentioned walls, and all the walls of a second plurality of said cells being free of said structural configuration and being essentially incapable of such relative adjustment.

9. A honeycomb structure as set forth in claim 8, wherein said extensible and contractable structural configuration comprises a fold in the cell wall.

10. A honeycomb structure as set forth in claim 9, wherein said first plurality of cells comprises at least one complete line of cells coextensive with one dimension of the honeycomb structure.

11. A honeycomb structure as set forth in claim 8, wherein said first plurality of cells comprises at least one complete line of cells coextensive with one dimension of the honeycomb structure.

12. A honeycomb structure as set forth in claim 8, wherein the walls of all of the cells lie generally in planes substantially perpendicular to the honeycomb-plane.

References Cited in the file of this patent

UNITED STATES PATENTS

| | | |
|---|---|---|
| 2,333,343 | Sendzimir | Nov. 2, 1943 |
| 2,369,006 | Banks | Feb. 6, 1945 |
| 2,477,852 | Bacon | Aug. 2, 1949 |
| 2,545,805 | Callender | Mar. 20, 1951 |
| 2,840,811 | McMillan | June 24, 1958 |

FOREIGN PATENTS

| | | |
|---|---|---|
| 794,217 | Great Britain | Apr. 30, 1958 |